May 31, 1955
J. E. CILLEY
2,709,506
REVERSE MOTION BRAKE MECHANISM
Filed Nov. 4, 1953
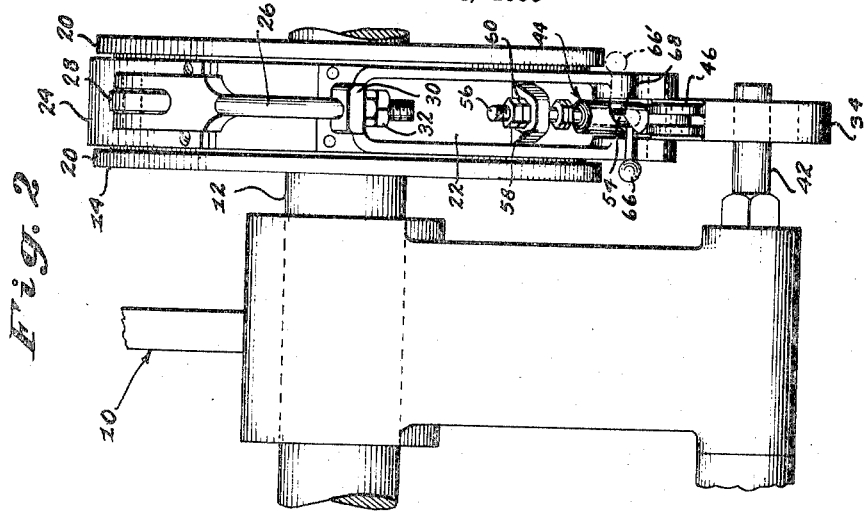
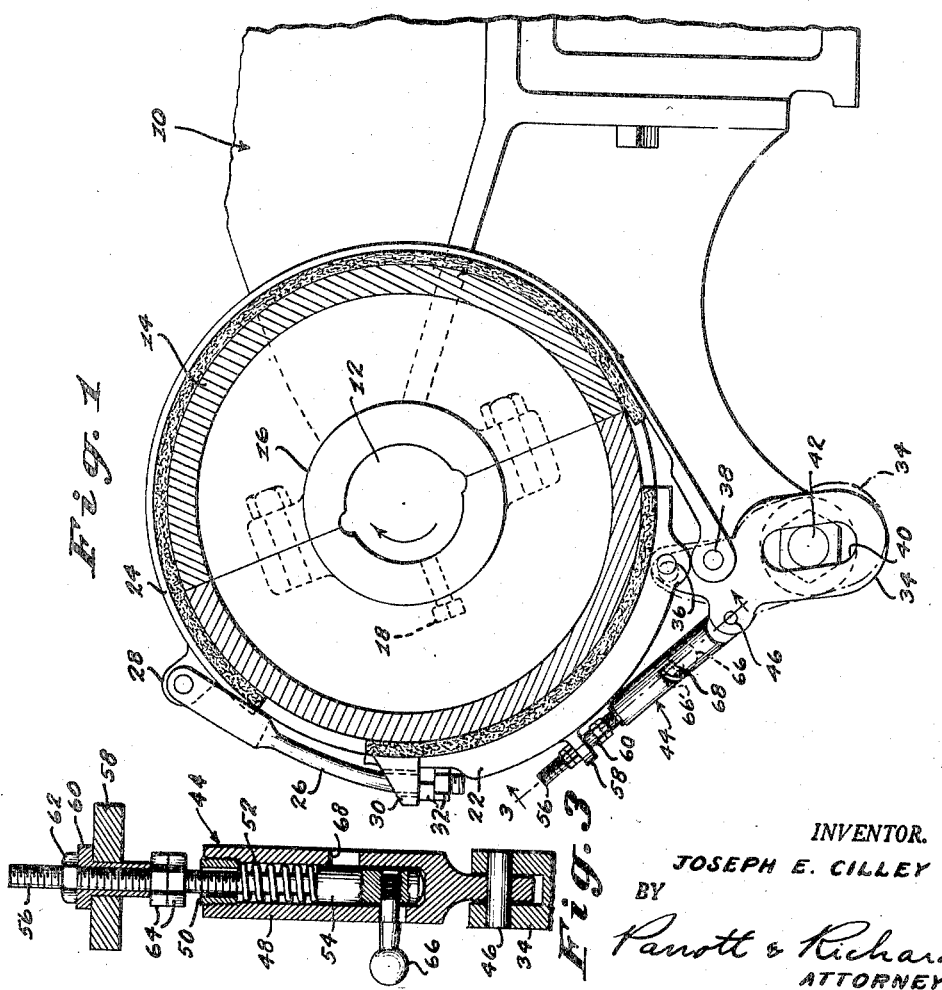
INVENTOR.
JOSEPH E. CILLEY
BY
Parrott & Richards
ATTORNEYS

United States Patent Office 2,709,506
Patented May 31, 1955

2,709,506

REVERSE MOTION BRAKE MECHANISM

Joseph E. Cilley, Hickory, N. C.

Application November 4, 1953, Serial No. 390,205

4 Claims. (Cl. 188—82.3)

This invention relates to reverse motion brakes, and more particularly to a brake mechanism of this sort adapted particularly for use on full fashioned knitting machines to prevent any reverse motion thereof when the machine is stopped.

The reverse motion brake mechanism of the present invention is an improvement of the similar mechanism previously disclosed in my prior Patent No. 2,053,250, granted September 8, 1936. In that prior patent, the brake mechanism disclosed comprises a brake shoe and brake band assembled on a brake drum, with a toggle linkage connecting the brake shoe to the brake band at one end for the purpose of setting the brake mechanism at active or inactive positions, as desired, by tightening or loosening the brake shoe and brake band with respect to the brake drum. This brake mechanism of my prior patent operates extremely well in active position, but when set at inactive position it often has the objectionable characteristic of chattering unduly because the toggle linkage results in dropping the brake shoe substantially away from the brake drum when it was manipulated to render the brake mechanism inactive. Also, the toggle linkage incorporates an operating lever which has to be extended in a substantial radial position from the brake mechanism when it was set to inactive position, and which extending lever is at times in the way when an operator needs to adjust a full fashioned knitting machine manually with the brake mechanism thereon released to inactive position.

According to the present invention, the above noted difficulties are entirely eliminated by providing a reverse motion brake mechanism which is settable between active and inactive positions while still maintaining the brake shoe and brake band assembled therewith in relatively close encircling relation with respect to the brake drum, and in which the projecting outline of the brake mechanism is substantially the same whether it is set in active or inactive position.

These and other features of the reverse motion brake mechanism of the present invention are described in further detail below in connection with the accompanying drawing, in which:

Fig. 1 is a fragmentary side elevation, partly in section, showing a brake mechanism embodying the present invention as it would appear installed on a full fashioned knitting machine;

Fig. 2 is a further fragmentary end elevation of the brake mechanism as seen from the left in Fig. 1; and Fig. 3 is a sectional detail taken substantially on the line 3—3 in Fig. 1.

Referring now in detail to the drawing, the reference character 10 indicates the fragmentary portion shown of a section frame in a full fashioned knitting machine, and the reference character 12 indicates the hand wheel shaft of the knitting machine which is journalled in the section frame 10, and other similar section frames, as disclosed more fully in my above noted Patent 2,053,250, to which reference is made for further details if desired.

The reverse motion brake mechanism of the present invention, as shown in the embodiment illustrated, comprises a brake drum 14 mounted on the hand wheel shaft 12 adjacent the section frame 10, and fixed to rotate with the hand wheel shaft 12 by means of a clamping hub 16 and set screw 18. The periphery of the brake drum 14 is formed with side flanges 20 providing a channel in the outer face thereof in which a brake shoe 22, and a brake band 24 assembled therewith, are disposed to encircle and ride the brake drum 14.

The brake band 24 is assembled at one end directly in alignment with the adjacent end of the brake shoe 22 by means of a connecting link member 26 having a yoke portion at one end pivotally fixed to the brake band 24 at a lug 28, and curving in general correspondence with the curvature of the brake drum 14 to a threaded portion at its other end, which is extended through an apertured lug provided at the adjacent end of the brake shoe 22 with lock nuts 32 engaging the threaded end of connecting link 26 behind the brake shoe lug 30, and thereby providing a tension link between the brake shoe 22 and brake band 24 at these adjacent ends.

Adjacent the other end of the brake shoe 22, a lever arm 34 is pivoted as indicated at 36, and the other end of the brake band 24 is also pivotally secured to this lever arm 34 intermediately of its length as indicated at 38, the end of the lever arm 34 remote from the brake shoe 22 being formed with an elongated slot at which it is pivotally fixed with respect to the section frame 10 by means of a reaction stud 42.

In addition, selectively settable means, as indicated generally by the reference numeral 44, is carried by the brake shoe 22 and pivotally connected with the lever arm 34, as indicated at 46, for pivoting the lever arm 34 to a first position with respect to the brake shoe 22, as indicated by full lines in Fig. 1, at which first position the brake shoe 22 and brake band 24 are tightened about the brake drum 14 sufficiently to grip the brake drum 14 unless loosened; and to a second position with respect to the brake shoe 22, as indicated by broken lines in Fig. 1, at which second position the brake shoe 22 and brake band 24 are loosened just enough so that they cannot be tightened to grip the brake drum 14.

The selectively settable means 44 provided for this purpose comprises, as shown best in Fig. 3, a tubular body member 48 having one end shaped for the previously mentioned pivotal connection with the lever arm 34 at 46, and the other end fitted interiorly with an annular bushing 50 forming an abutment to contain a compression spring 52 therein so as to bear against the oppositely facing shoulder of a positioning plunger 54 from which a threaded shank 56 extends slidably through the compression spring 52 and the annular bushing 50 for assembly with the brake shoe 22 at a lug 58 formed thereon. As shown in Fig. 3, the threaded shank 56 is assembled on the brake shoe 22 at the lug 58 by means of a flanged adjustment collar 60 threaded thereon and disposed to extend slidably through an aperture in the brake shoe lug 58 with the flanged portion thereof arranged for abutment with the side of the brake shoe lug 58 facing away from the lever arm 34. Lock nuts are also disposed on the threaded shank 58 at each end of the adjustment collar 60, as at 62 and 64, to fix the collar 60 at a given adjusted position.

Beyond the bearing shoulder for the compression spring 52, the positioning plunger 54 is fitted with a manipulating knob 66 extending laterally therefrom through a cam slot in the tubular body 48, this cam slot 68 extending with a more or less spiral inclination around a sufficient portion of the circumference of the tubular body 48 to allow movement of the manipulating knob 66 therein between first and second oppositely disposed positions as shown best in Fig. 2, in which the manipulating knob 66 is shown in full lines at the first position and a dotted outline thereof is shown at 66' to indicate the second position.

At the first position, the manipulating knob is disposed in the cam slot 68 at the end thereof inclined toward the lever arm 34, so that at this first position, the positioning plunger 54 is moved to its farthest position within the tubular body 48 and thereby results in lessening the extent of the selectively settable means 44 to its minimum overall length. At this minimum overall length, the adjustment collar 60 is set on the threaded shank 56 of the positioning plunger 54 so that the flange of adjustment collar 60 bears against the brake shoe lug 58 to tension and maintain the lever arm 34 at the full line position shown in Fig. 1.

At this full line position, the lever arm 34 is pivoted with respect to the brake shoe 22 so that the brake shoe 22 and brake band 24 are tightened about the brake drum 14. By setting the adjustment collar 60 properly on the threaded shank 56 of positioning plunger 54, this tightening can be made such as to cause the brake shoe 22 and brake band 24 to grip the brake drum 14 unless loosened.

With the hand wheel shaft 12 rotating in its normal operating direction, as indicated by the directional arrow in Fig. 1, it will be seen that the action of the brake drum 14 against the brake shoe 22 will be to loosen the brake shoe 22 and brake drum 24 with respect to the brake drum 14, because of the manner in which the lever arm 34 is pivotally connected, so that the hand wheel shaft will be allowed to rotate freely when operating in its normal direction. However, if it happens that upon stopping of the knitting machine there is any tendency to cause reverse rotation of the hand wheel shaft 12, and consequently the brake drum 14, the action of the brake drum 14 on the brake shoe 22 will be to cause further tightening of the brake shoe 22 and brake band 24, again because of the pivoted connections at the lever arm 34, so as to cause immediate gripping and stopping of the brake drum 14 and hand wheel shaft 12 from reverse motion.

At the second position 66', however, the manipulating knob is disposed in the cam slot 68 at its other end so as to move the positioning plunger 54 outwardly within the tubular body 48 and thereby extend the selectively settable means 44 to a greater length. This extension of the settable means 44 results in releasing the adjustment collar 60 from its position of bearing against the brake shoe lug 58 and thereby releases the tightened disposition of the brake shoe 22 and brake band 24 about the brake drum 14 enough so that there is insufficient action between the brake drum 24 and brake shoe 22 to tighten the shoe 22 and brake band 24 on the brake drum 14 no matter in which way the hand wheel shaft 12 and brake drum 14 rotate.

It will be recognized that the first position for the manipulating knob 66 represents the active position for the brake mechanism of the present invention, at which it would be set under normal operating conditions to prevent reverse motion, which the second position 66' represents the inactive position of the brake mechanism at which it is released to allow manual rotation of the hand wheel shaft 12 in any direction desired.

The present invention has been described in detail above for purposes of illustration only and is not intended to be limited by this description or otherwise except as defined in the appended claims.

I claim:

1. A reverse motion brake mechanism comprising a brake drum, a brake shoe and a brake band assembled therewith for encircling and riding said brake drum, said brake band being assembled at one end in alignment with the adjacent end of said brake shoe, a lever arm pivoted adjacent the other end of said brake shoe, said brake band having the other end thereof pivotally secured intermediately of the length of said lever arm, said lever arm being pivotally fixed adjacent the end thereof remote from said brake shoe, and selectively settable means carried by said brake shoe for pivoting said lever arm to a first position at which said brake shoe and brake band are tightened about said brake drum sufficiently to grip said brake drum unless loosened and to a second position at which said brake shoe and brake band are loosened just enough so that they cannot be tightened to grip said brake drum.

2. A reverse motion brake mechanism comprising a brake drum, a brake shoe and a brake band assembled therewith for encircling and riding said drum, means connecting said brake shoe at one end in alignment with the adjacent end of said brake band, a lever arm pivoted adjacent the other end of said brake shoe and having the other end of said brake band pivotally connected thereto intermediately of its length, fixed reaction means engaging said lever arm adjacent the end thereof remote from said brake shoe, and extensible means carried by said brake shoe and pivotally connected to said lever arm oppositely with respect to said brake band and with a greater mechanical advantage than said brake band with respect to the end of said lever arm pivoted on said brake shoe, said extensible means being selectively settable to a first position at which said lever arm is pivoted and held with respect to said brake shoe so that said brake shoe and brake band are tightened to grip said brake drum unless loosened and to a second position at which said lever arm is released to loosen said brake shoe and brake band just enough so that they cannot be tightened to grip said brake drum.

3. A reverse motion brake mechanism as defined in claim 2 and further characterized in that said extensible means comprises a tubular member pivoted at one end on said lever arm and having a tubular bushing fitted internally thereof at the other end, a plunger disposed within said tubular member and having a shank of reduced diameter extending therefrom slidably through said bushing, a spring contained by said bushing in said tubular member to bear against said plunger, a manipulating knob fixed on said plunger and extending laterally therefrom, a cam slot in said tubular member through which said manipulating knob extends laterally, said cam slot being spirally inclined in an extent allowing oppositely extending first and second dispositions of said manipulating knob, and a flanged collar adjustably fitted on said shank for slidably engaging said brake shoe with the collar flange disposed for bearing on said brake shoe toward the end thereof at which said lever arm is pivoted.

4. A reverse motion brake mechanism comprising, in combination with an operating shaft mounted for rotation, a brake drum fixed on said shaft, a brake shoe and a brake band assembled therewith for encircling and riding said drum, means connecting said brake band and brake shoe at adjacent ends thereof to ride said brake drum in alignment, a lever arm pivotally connected at one end and intermediately of the length thereof respectively at the other ends of said brake shoe and brake band for tightening said shoe and brake band about said brake drum upon pivoting of said lever arm in one direction, reaction means fixed in relation to the mounting for said operating shaft and having the end of said lever arm remote from said brake shoe and brake band in floating engagement therewith, and extensible means carried by said brake shoe and pivotally connected with said lever arm, said extensible means being selectively settable to a first position at which said lever arm is pivoted and held with respect to said brake shoe, so that said brake shoe and brake band are tightened to react for gripping said brake drum unless loosened and to a second position at which said lever arm is released to loosen said brake shoe and brake band just enough so that they cannot react to grip said brake drum.

References Cited in the file of this patent

UNITED STATES PATENTS

| | | |
|---|---|---|
| 2,053,250 | Cilley | Sept. 8, 1936 |
| 2,383,276 | Smith | Aug. 21, 1945 |